(12) United States Patent
Gray et al.

(10) Patent No.: US 8,365,837 B2
(45) Date of Patent: Feb. 5, 2013

(54) RESILIENTLY MOUNTED AGRICULTURAL TOOL AND IMPLEMENT THEREWITH

(75) Inventors: Geof J. Gray, Burford (CA); John Mark Averink, Norwich (CA); Jacobus A. Rozendaal, LaSalette (CA); Mikhail Rodionov, Toronto (CA)

(73) Assignee: Salford Farm Machinery Ltd. (CA)

( * ) Notice: Subject to any disclaimer, the term of this patent is extended or adjusted under 35 U.S.C. 154(b) by 65 days.

(21) Appl. No.: 12/964,314

(22) Filed: Dec. 9, 2010

(65) Prior Publication Data

US 2011/0132627 A1    Jun. 9, 2011

Related U.S. Application Data

(60) Provisional application No. 61/285,176, filed on Dec. 9, 2009.

(51) Int. Cl.
*A01B 61/00* (2006.01)

(52) U.S. Cl. ........................................ 172/265; 172/572

(58) Field of Classification Search .................. 172/572, 172/265, 573, 574, 266, 705
See application file for complete search history.

(56) References Cited

U.S. PATENT DOCUMENTS

| | | | |
|---|---|---|---|
| 1,225,853 A * | 5/1917 | Pidgeon ........................ | 172/709 |
| 1,817,851 A | 8/1931 | Shelton | |
| 2,211,675 A | 9/1939 | Rushbrook | |
| 2,320,742 A | 6/1943 | Newkirk | |
| 2,352,963 A * | 7/1944 | McMahon ..................... | 172/451 |
| 2,613,586 A * | 10/1952 | Boenig ........................... | 172/126 |
| 2,664,040 A | 12/1953 | Beard | |
| 2,952,324 A | 9/1960 | Shumaker et al. | |
| 2,998,083 A | 8/1961 | Van Der Lely et al. | |
| 3,061,018 A | 10/1962 | Olson | |
| 3,171,243 A | 3/1965 | Johnston | |
| 3,296,985 A | 1/1967 | Shelton | |
| 3,486,566 A * | 12/1969 | Nja ............................... | 172/265 |
| 3,493,055 A * | 2/1970 | Van Peursem ................ | 172/708 |
| 3,627,061 A * | 12/1971 | Sample .......................... | 172/462 |
| 3,640,348 A | 2/1972 | Womble | |
| 3,650,334 A | 3/1972 | Hagenstad | |
| 4,004,640 A * | 1/1977 | Bland ............................ | 172/710 |
| 4,063,598 A * | 12/1977 | Boldrin ......................... | 172/705 |
| 4,094,363 A | 6/1978 | McCoomb | |
| 4,128,130 A * | 12/1978 | Green et al. .................. | 172/266 |
| 4,185,699 A * | 1/1980 | Lewison ....................... | 172/724 |
| 4,333,535 A * | 6/1982 | Hentrich, Sr. ................ | 172/572 |
| 4,396,070 A * | 8/1983 | Brandner et al. ............. | 172/572 |
| 4,407,372 A * | 10/1983 | Rozeboom .................... | 172/572 |
| 4,412,588 A | 11/1983 | van der Lely et al. | |
| 4,452,319 A * | 6/1984 | Miguet et al. ................. | 172/573 |
| 4,520,875 A | 6/1985 | Deckler | |
| 4,520,878 A * | 6/1985 | Smith et al. ................... | 172/705 |
| 4,589,497 A | 5/1986 | Kovar | |

(Continued)

FOREIGN PATENT DOCUMENTS

DE    2903620 A1    8/1980
DE    9102567 U1    5/1991

(Continued)

*Primary Examiner* — Arpad Fabian-Kovacs
(74) *Attorney, Agent, or Firm* — Katten Muchin Rosenman LLP

(57) ABSTRACT

A mounting device for a tillage assembly that comprises a resilient element and a horizontal pivot axis, which allows upward and rearward deflection of a tillage blade in response to impact with obstacles. the assembly advantageously allows lateral deflection of at least a support arm of the assembly in response to impact with obstacles, which may be enhanced by providing the assembly with a pivot means having a resilient bushing. The resilient element and/or the resilient bushing may comprise elastomeric materials.

21 Claims, 17 Drawing Sheets

U.S. PATENT DOCUMENTS

| | | | |
|---|---|---|---|
| 4,694,759 A * | 9/1987 | Dreyer et al. | 111/151 |
| 4,724,910 A * | 2/1988 | Wheeler | 172/464 |
| 4,745,978 A | 5/1988 | Williamson | |
| 4,759,411 A * | 7/1988 | Williamson | 172/572 |
| 4,796,550 A * | 1/1989 | Van Natta et al. | 111/135 |
| 4,828,042 A * | 5/1989 | Arnold | 172/572 |
| 5,042,590 A | 8/1991 | Bierl et al. | |
| 5,267,619 A | 12/1993 | Eversole | |
| 5,443,126 A * | 8/1995 | Skj veland | 172/271 |
| 5,450,908 A * | 9/1995 | Hagman et al. | 172/239 |
| 5,482,121 A * | 1/1996 | Draney et al. | 172/40 |
| 5,678,930 A * | 10/1997 | Kreftmeyer et al. | 384/157 |
| 6,158,523 A | 12/2000 | Gengler et al. | |
| 6,412,571 B1 | 7/2002 | McIlhargey | |
| 6,695,069 B2 * | 2/2004 | Rozendaal | 172/601 |
| 7,520,338 B2 | 4/2009 | Stokes | |
| 7,762,345 B2 | 7/2010 | Rozendaal et al. | |
| 2007/0261865 A1 | 11/2007 | Taege et al. | |

FOREIGN PATENT DOCUMENTS

| | | |
|---|---|---|
| DE | 10137624 B4 | 4/2006 |
| FR | 2882216 A1 | 8/2006 |

* cited by examiner

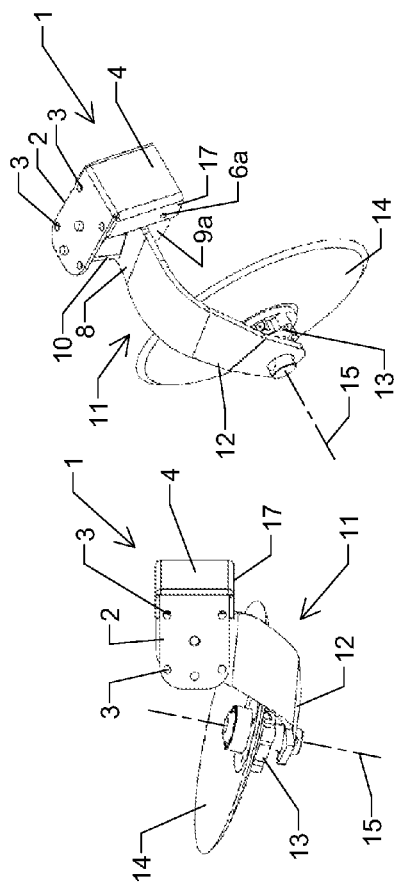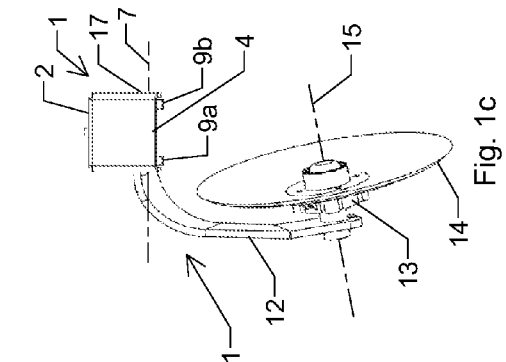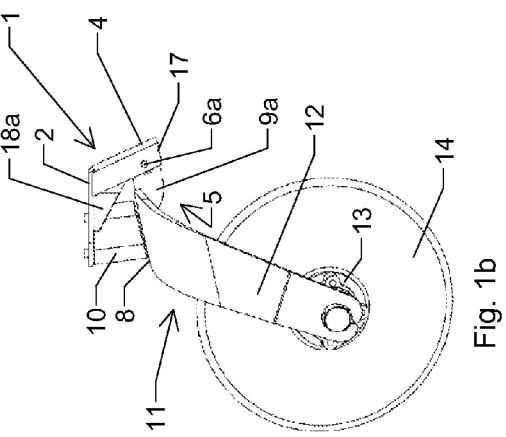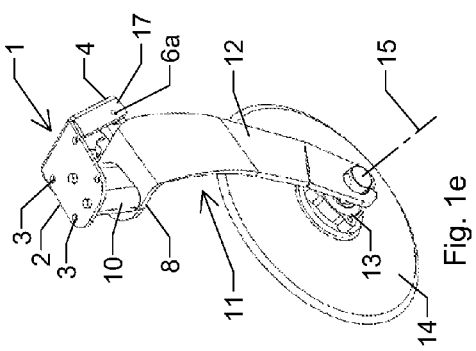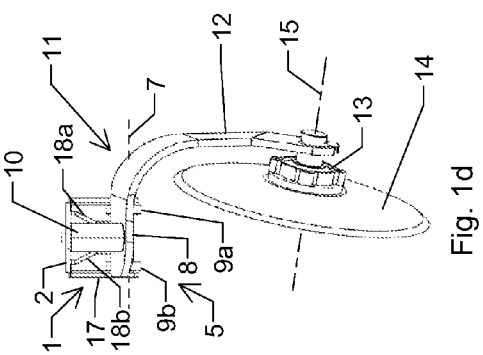

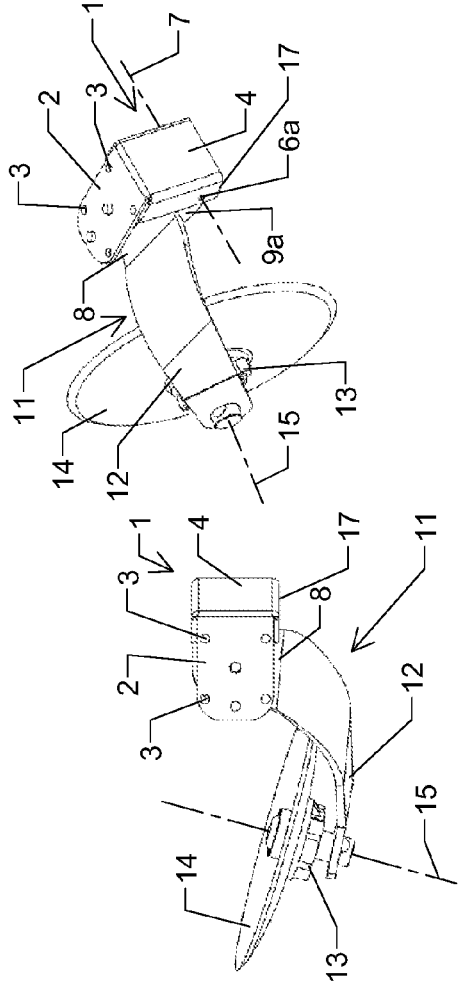
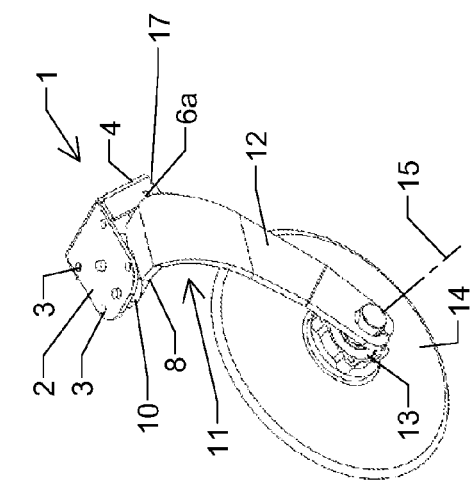
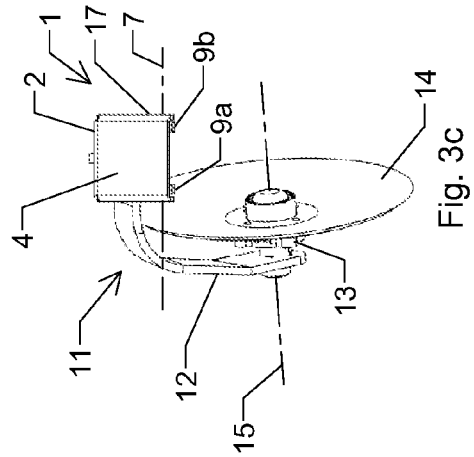
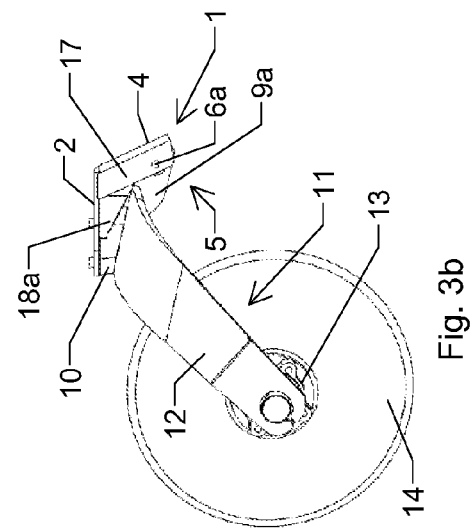
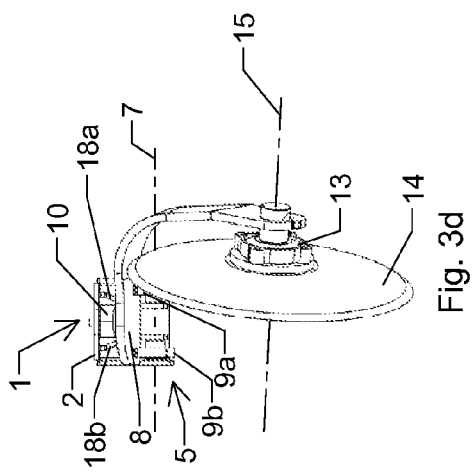

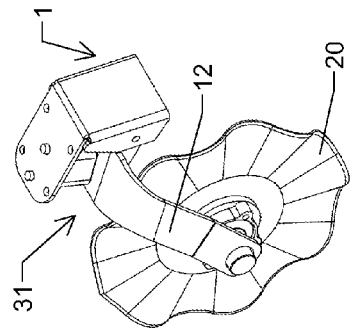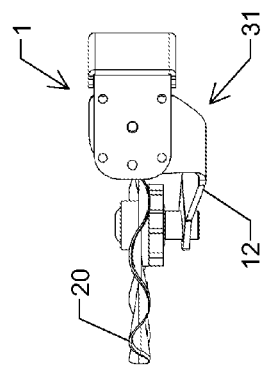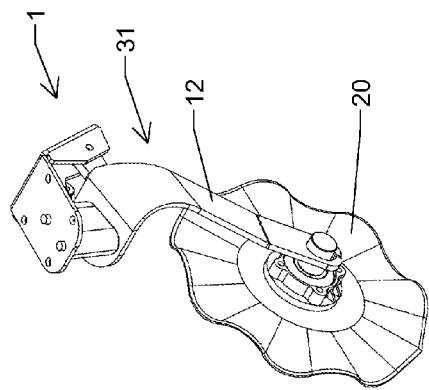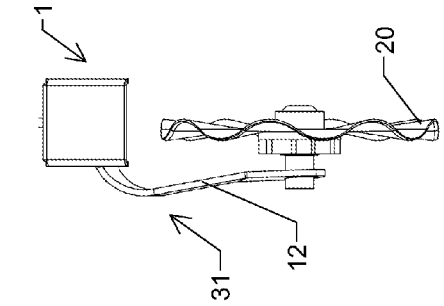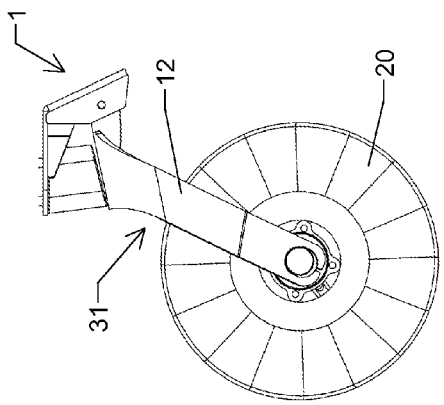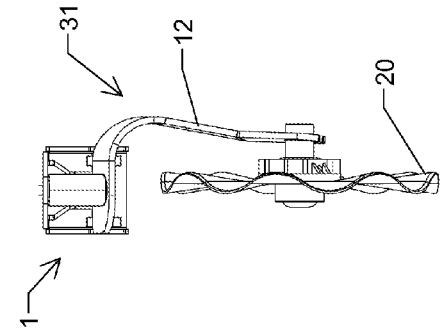

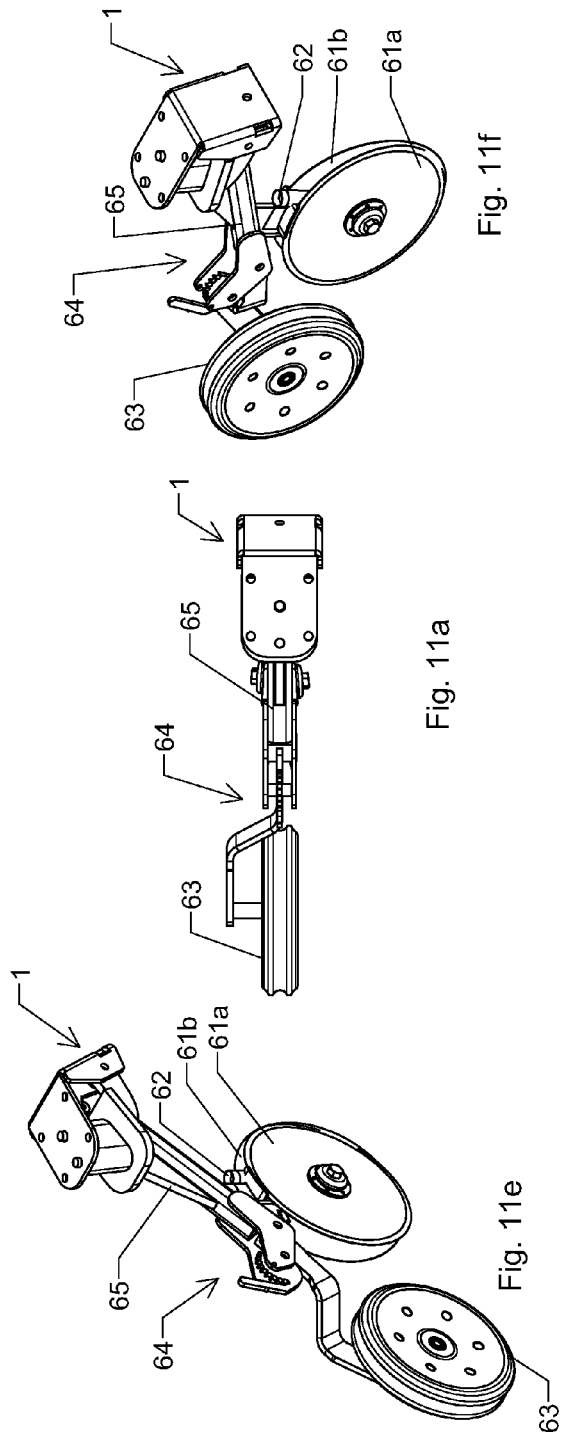

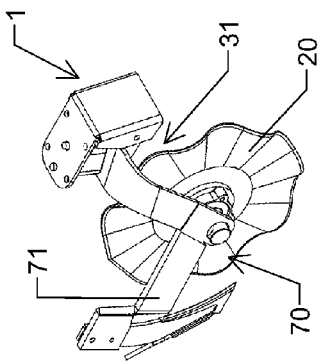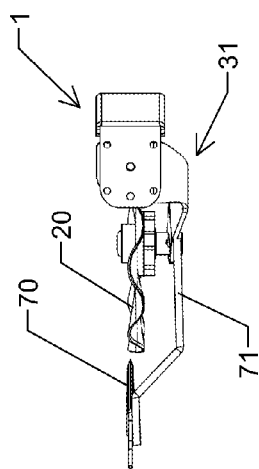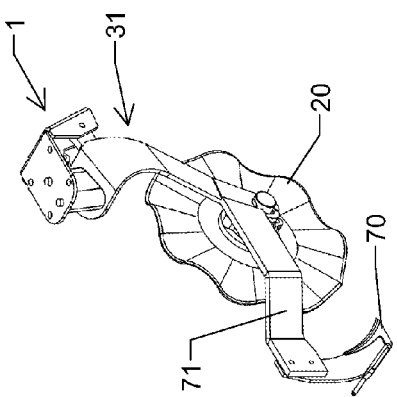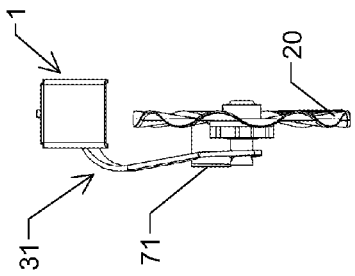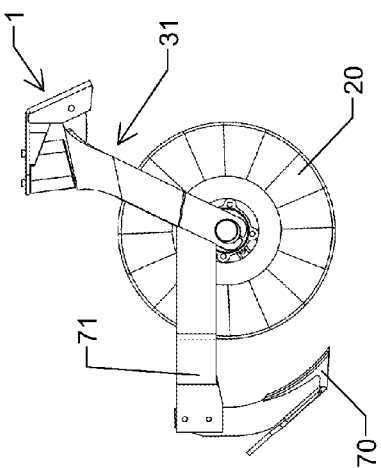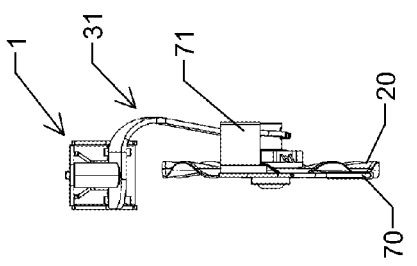

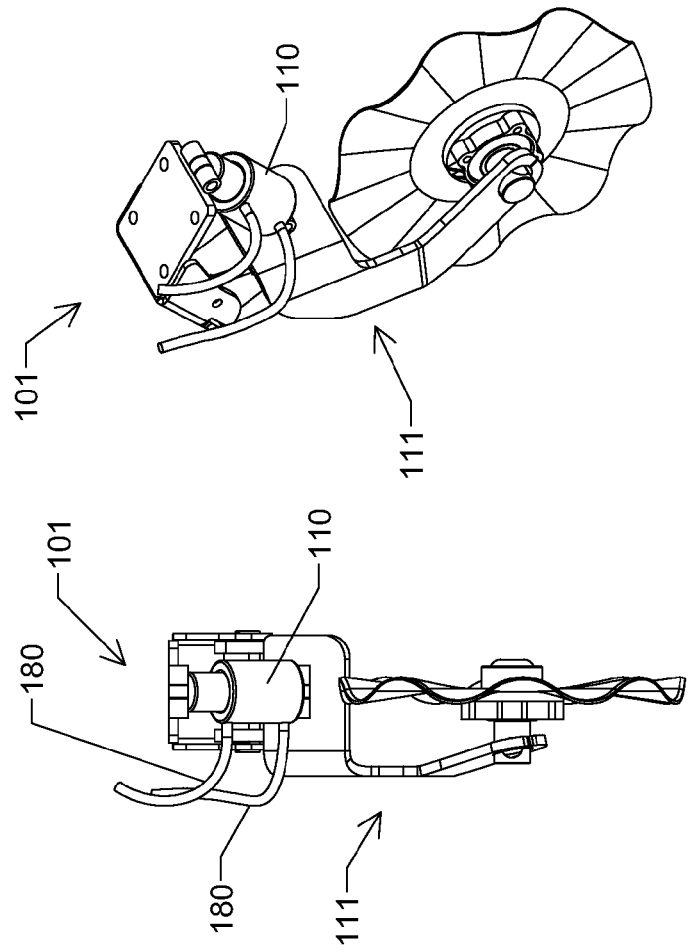
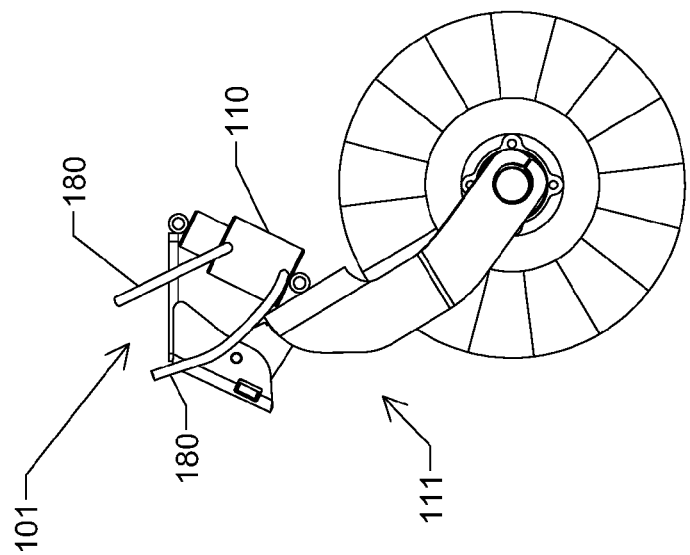
Fig. 13c
Fig. 13b
Fig. 13a

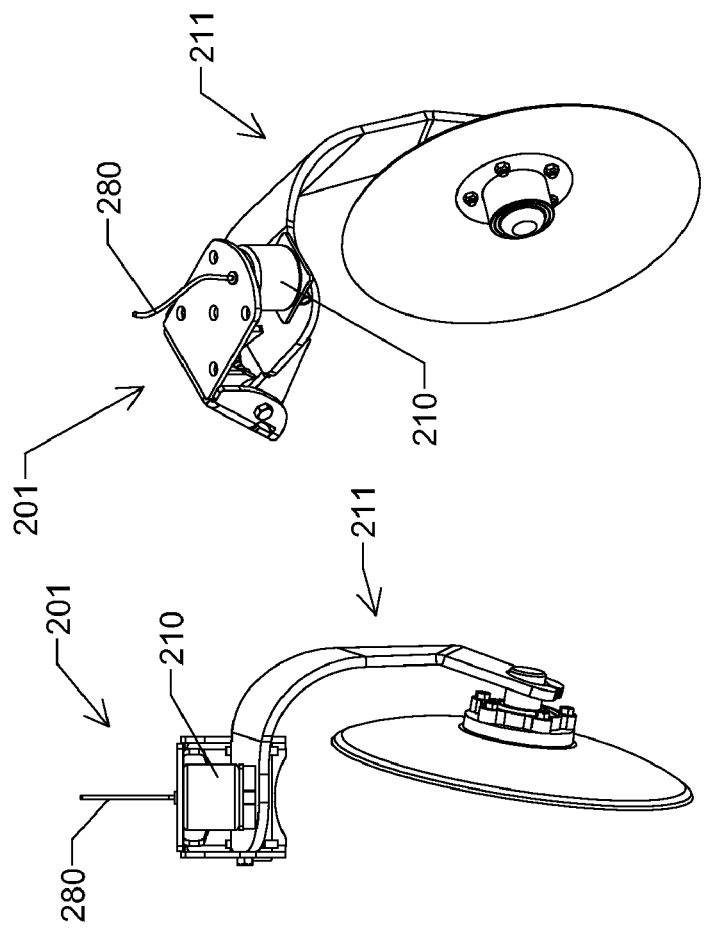
Fig. 14c
Fig. 14b
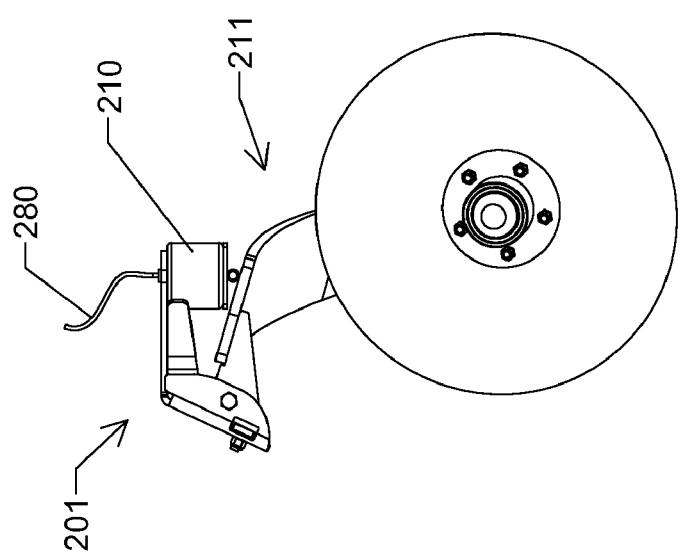
Fig. 14a

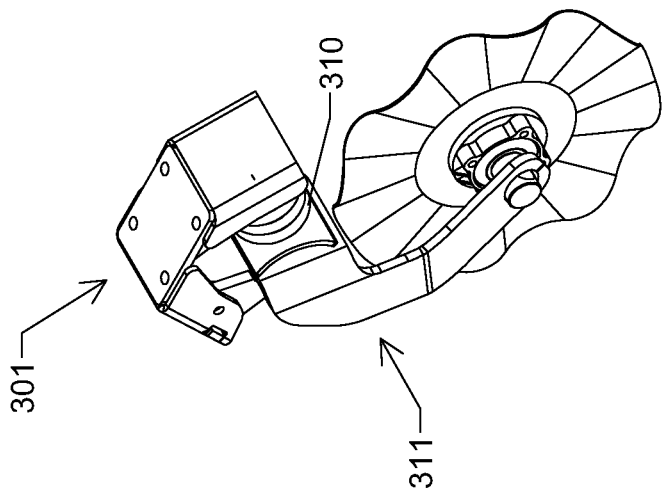
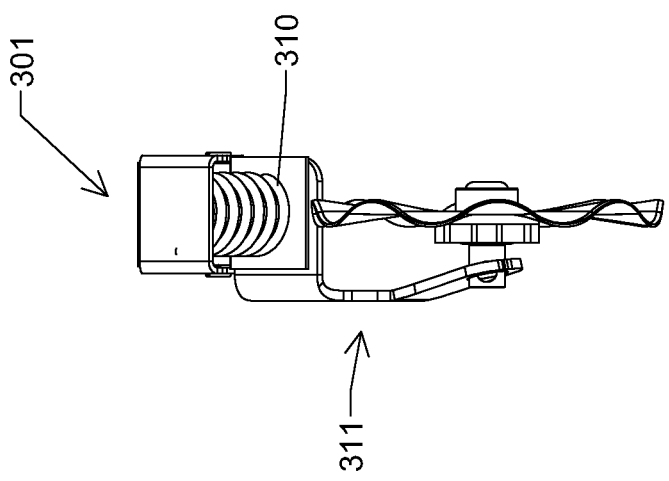
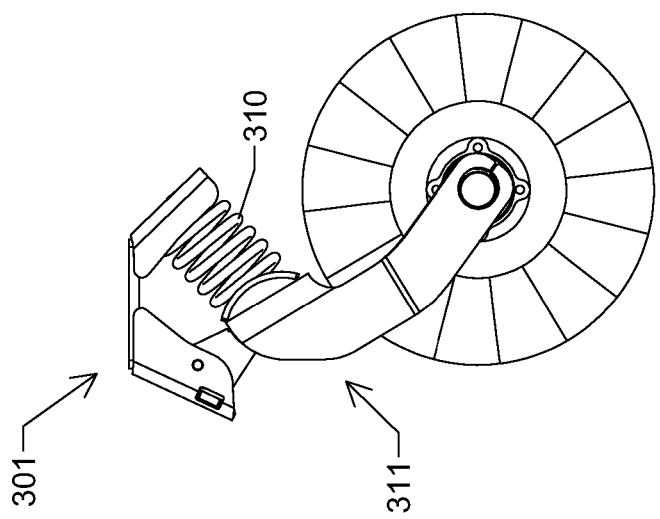

RESILIENTLY MOUNTED AGRICULTURAL TOOL AND IMPLEMENT THEREWITH

CROSS-REFERENCE TO RELATED APPLICATIONS

This application claims the benefit of U.S. Patent Application 61/285,176, filed Dec. 9, 2009, the contents of which are incorporated herein by reference.

FIELD OF THE INVENTION

The invention relates to agricultural tools that include mounting means, which permit upward deflection and optionally lateral deflection in response to impact with obstacles. In particular, the invention relates to tillage assemblies comprising mounting means with resilient elements that permit deflection of a tillage blade upwardly and optionally laterally, as well as tillage implements comprising the assemblies.

BACKGROUND OF THE INVENTION

Tillage implements, such as disc harrows, are known in agriculture for working the soil either following crop harvest or in preparation for spring planting. Typically, tillage implements work the soil at a depth of 4-6" in an effort to turn over new soil and cover crop residue on the surface. This is sometimes known as conventional or primary tillage and is in marked contrast to secondary or conservation tillage.

Disc harrows normally comprise a plurality of concave disc shaped blades mounted on a common gang shaft suspended beneath a tillage implement frame. The entire shaft is mounted at an angle relative to the direction of travel of the implement. By setting the angle, a different degree of tillage can be obtained. Attempts have been made to mount these shafts using C-shaped springs in an effort to absorb impact from obstacles present in the field. However, since the entire shaft is forced to move upwardly and deflect when a single disc encounters and obstacle, the force transmitted to the frame is still substantial. This can result in damage to the blades, the shaft bearings, or the shaft mounting assemblies. As a result, farmers are normally required to operate disc harrows at slower speeds in the range of 3-5 mph.

An additional problem with disc harrows is that, due to the close spacing of the blades on the gang shaft, plugging of crop residue can occur between the discs. This impedes operation of the implement and requires the farmer to stop and manually clean out the space between the discs before continuing.

A conservation tillage implement, designed to work the soil at shallow depths has been designed with individually mounted coulter wheel assemblies that are staggered. This apparatus is described in U.S. Pat. No. 7,762,345. This implement is for minimum tillage, not primary tillage, and comprises straight coulter wheels that do not engage with the soil in order to turn fresh soil on to the surface, but rather cut through crop residue by riding along parallel to the direction of travel of the implement. The individually mounted coulter wheel assemblies each comprise a coil spring having a horizontal spring axis, as described in U.S. Pat. No. 6,412,571. Attempts to place concave disc blades suitable for use in turning the soil on this assembly have resulted in an off-axis load being imparted to the coil spring. This causes the spring to deflect during normal operation of the tillage implement and results in the blades adopting an orientation more parallel with the direction of travel of the implement. This impedes the ability of the blade to turn the soil, which generally requires an angle with respect to the direction of travel.

French patent 2882216 discloses a tillage assembly comprising a resilient elastomeric cylinder between an underside of the mounting assembly and the arm to which the blade is ultimately mounted. Plates are provided on either side of the mounting assembly proximal the elastomeric cylinder o prevent sideways deflection of the blade and arm, since the elastomeric cylinder has little capacity to resist sideways loading. Sideways loading would impart excessive wear to the bolt and ring arrangement that provides for the pivoting action of the assembly, leading to premature mechanical failure. Thus, the blade assembly is designed to permit little or no sideways (lateral) movement of the arm or blade. Use of a concave disc blade at an angle to the direction of travel would impart such an undesirable sideways loading.

As a result, there remains a need for an improved tillage blade mounting assembly and for tillage implements comprising same. It would be desirable that the improved tillage assembly provide for both limited lateral and upward/rearward movement in response to impact with obstacles in a manner that doesn't impart excessive wear or damage to the blade assembly.

SUMMARY OF THE INVENTION

According to an aspect of the present invention, there is provided a tillage assembly comprising: a mounting means adapted for use with an attachment means for securing the mounting means to a frame member of an agricultural implement, the mounting means comprising structure operatively linking i) a lower mounting plate oriented beneath the frame member, ii) a resilient element between the frame member and the lower mounting plate, and, iii) a pivot means forward of the resilient element comprising a horizontal pivot axis about which the lower mounting plate is allowed to pivot relative to the frame member to thereby deform the resilient element; a support arm extending downwardly and rearwardly from the mounting means and interconnected with the lower mounting plate to pivot therewith about the horizontal pivot axis; a rotatable hub attached to the support arm distal from the mounting means, the rotatable hub having a rotation axis passing therethrough; a concave rotatable tillage blade attached to the rotatable hub concentric with the rotation axis; and, wherein the support arm is configured and/or the rotatable hub is mounted to the support arm in order to provide an angle between the rotation axis and the forward direction and an angle between the rotation axis and horizontal.

According to another aspect of the invention, there is provided a tillage assembly comprising: a mounting means comprising structure operatively linking i) an upper mounting plate, ii) a lower mounting plate oriented beneath the upper mounting plate, iii) a resilient element between the upper and lower mounting plates, and, iv) a pivot means forward of the resilient element comprising a horizontal pivot axis about which the lower mounting plate is allowed to pivot relative to the upper plate to thereby deform the resilient element; a support arm extending downwardly and rearwardly from the mounting means and interconnected with the lower mounting plate to pivot therewith about the horizontal pivot axis; a rotatable hub attached to the support arm distal from the mounting means, the rotatable hub having a rotation axis passing therethrough; a concave rotatable tillage blade attached to the rotatable hub concentric with the rotation axis; and, wherein the support arm is configured and/or the rotatable hub is mounted to the support arm in order to provide an angle between the rotation axis and the forward direction and an angle between the rotation axis and horizontal.

According to yet another aspect of the invention, there is provided a tillage assembly comprising: a mounting means adapted for use with an attachment means for securing the mounting means to a frame member of an agricultural implement, the mounting means comprising structure operatively linking i) a lower mounting plate oriented beneath the frame member, ii) a resilient element between the frame member and the lower mounting plate, and, iii) a pivot means forward of the resilient element comprising a horizontal pivot axis about which the lower mounting plate is allowed to pivot relative to the frame member to thereby deform the resilient element; a support arm extending downwardly and rearwardly from the mounting means and interconnected with the lower mounting plate to pivot therewith about the horizontal pivot axis; a rotatable hub attached to the support arm distal from the mounting means, the rotatable hub having a rotation axis passing therethrough; a rotatable tillage blade attached to the rotatable hub concentric with the rotation axis; and, wherein the support arm comprises at least a resilient portion that deflects in response to lateral movement of the tillage blade due to impact with obstacles.

According to still another aspect of the invention, there is provided a tillage assembly comprising: a mounting means adapted for use with an attachment means for securing the mounting means to a frame member of an agricultural implement, the mounting means comprising structure operatively linking i) a lower mounting plate oriented beneath the frame member, ii) a resilient element between the frame member and the lower mounting plate, and, iii) a pivot means forward of the resilient element comprising a horizontal pivot axis about which the lower mounting plate is allowed to pivot relative to the frame member to thereby deform the resilient element; a support arm extending downwardly and rearwardly from the mounting means and interconnected with the lower mounting plate to pivot therewith about the horizontal pivot axis; a rotatable hub attached to the support arm distal from the mounting means, the rotatable hub having a rotation axis passing therethrough; a rotatable tillage blade attached to the rotatable hub concentric with the rotation axis; and, wherein the support arm comprises a vertical pivot that is operable to permit a portion of the support arm proximal the rotatable hub to pivot relative to the mounting means about a vertical axis in response to directional changes of the implement.

According to even another aspect of the present invention, there is provided a tillage implement comprising: an implement frame comprising frame members; at least two longitudinally spaced apart rows of tillage assemblies as previously described secured to the frame members using the attachment means; one row of tillage assemblies comprising a first assembly with a concave side of the rotatable tillage blade oriented towards a first side of the implement; an adjacent row of tillage assemblies comprising a second assembly with a concave side of the rotatable tillage blade oriented towards a second side of the implement; and, each first tillage assembly in the first row having a complementary second tillage assembly in the second row, the concave sides of the complementary first and second tillage assemblies facing one another, the complementary tillage assemblies laterally spaced apart from one another.

According to yet still another aspect of the present invention, there is provided a mounting means for resiliently securing agricultural tools to an implement frame, the mounting means adapted for use with an attachment means for securing the mounting means to a frame member of the implement, the mounting means comprising structure operatively linking: a lower mounting plate oriented beneath the frame member; a resilient element between the frame member and the lower mounting plate; a pivot means forward of the resilient element comprising a horizontal pivot axis about which the lower mounting plate is allowed to pivot relative to the frame member to thereby deform the resilient element; and, a support arm interconnected with the lower mounting plate extending downwardly and rearwardly therefrom, the support arm able to pivot with the lower plate about the horizontal pivot axis.

The invention comprises mounting means for agricultural tools, particularly tillage assemblies, comprising a resilient element and a horizontal pivot axis to permit upward deflection of the support arm in response to impact with obstacles. During such upward deflection, the resilient element is deformed in response to pivoting about the axis, resisting the upward movement and reducing the likelihood of damage to the tillage assembly and/or the implement. In one embodiment, the resilient element may be compressed during deformation. The resilient element may comprise an elastomer, a spring, a pneumatic or hydraulic cylinder, a pneumatic or hydraulic compressible reservoir, for example an air bag or any other suitable means. The resilient element preferably comprises an elastomer or elastomeric portion that is compressed during deformation in order to resist the upward movement. The resilient element may have a solid cross-section or a hollow cross-section.

In certain embodiments, the geometry of the assembly is selected such that the majority of the load imparted by upward deflection of the tillage blade is transferred directly to the resilient element. For example, in one embodiment, is vertically aligned with the resilient element. In other embodiments, the point of first intersection between the tillage blade and the soil, the angle of the tillage blade, and the shape of the support arm are selected so that forces acting on the tillage blade are resolved vertically through the resilient element. This reduces the likelihood of damage to other parts of the tillage assembly and maximizes the effectiveness of the resilient element in dampening received loads.

The support arm may comprise at least a resilient portion to permit sideways deflection of the support arm in response to lateral deflection of the tillage blade due to impact with obstacles. The entire support arm may comprise the resilient portion. The resilient portion may be made from a material with sufficient stiffness to resist lateral deflection during normal operation, for example spring steel. The amount of lateral force required to cause lateral deflection of the support arm by 1 inch at the rotatable hub may be at least 300 pounds, at least 500 pounds, at least 1000 pounds or at least 1500 pounds applied to the rotatable hub. This provides sufficient stiffness to resist lateral movement during normal operation, while still allowing the support arm to move laterally in response to impact with obstacles.

Lateral movement of the support arm places stress on the horizontal pivot pin. In order to reduce the likelihood of damage to the pivot pin, in certain embodiments of the mounting means the pivot means may comprise a resilient bushing that deforms in order to permit the pivot pin to momentarily adopt an angular orientation relative to horizontal. This allows the pin to move in response to lateral movement of the support arm and reduces the likelihood of pin breakage. The resilient bushing may comprise an elastomeric material. The resilient bushing desirably also advantageously provides the pivot pin with protection from wear caused by dirt ingress to the pivot means.

The support arm may comprise a vertical pivot that permits a lower portion of the support arm to move relative to an upper portion of the support arm about a vertical axis. This allows the implement to which the tillage assembly is mounted to be turned at the end of the field without raising the implement, which could otherwise result in damage to the tillage assembly. The support arm may further comprise means to restrict pivoting movement about the vertical axis passing through the vertical pivot to a maximum angle relative to the forward direction, the maximum angle being from 10 to 30 degrees.

The tillage assembly provides for mounting the tillage blades in a particular orientation relative to the ground and the direction of travel of the implement in order that forces acting on the assembly due to movement of the blade through the soil are balanced and resolve substantially vertically. This prevents an off-axis load from acting on the resilient element when the assembly is in use and allows the blade to track through the soil at a desired angle. Impact with obstacles, such as rocks, is desirably absorbed by deflection of the resilient element, the resilient portion of the support arm, and/or the elastomeric bushing(s) to thereby mitigating damage to the assembly.

Tillage implements comprising the tillage assemblies are able to operate at higher speeds than can usually be obtained for tillage implements, due to the absorption of impact energy. Typical operating speeds for such implements may be from 6 to 14 mph or 8 to 12 mph. The tillage implements may comprise a plurality of the tillage assemblies in substantially matched pairs, each pair comprising a first and second assembly. The tillage implements may comprise two or more rows of the tillage assemblies when seen in top view. The tillage implements may comprise three or more rows of the tillage assemblies when seen in top view. The tillage implements may comprise four or more rows of the tillage assemblies when seen in top view. There may be an even number of rows of the tillage assemblies. There may be a substantially equal number of first and second assemblies. One of the two rows may comprise one or more first assemblies and the other may comprise one or more second assemblies. The first and second assemblies may be provided in complementary pairs. The pairs may be arranged with one assembly on one row and the complementary assembly on an adjacent row. When provided with concave tillage blades, the first and second assemblies may be arranged on the two rows such that the concave sides of the tillage blades are oriented towards one another. In this configuration, the assemblies may be laterally spaced apart by a distance sufficient to permit soil thrown in one direction by a first tillage assembly to be thrown in an opposite direction by a second tillage assembly in order to substantially level the soil surface following tillage and/or substantially prevent furrow formation. The assemblies may be laterally spaced apart by a distance sufficient to prevent plugging of crop residue between the assemblies.

There may be additional agricultural tools or field working tools, such as S-tines, C-shanks, or coulter wheel assemblies (with a straight or wavy blade rather than a concave blade) provided on the rows. An applicator for anhydrous ammonia may also be provided as one of the agricultural tools. The additional field working or agricultural tools desirably comprise a resilient element and horizontal pivot axis, as described above, in order to absorb energy from impact with obstacles.

In another aspect of the invention, a user configurable agricultural system is provided comprising the inventive mounting means and a variety of interchangeable field working tools or agricultural tools each featuring an upper passageway configured for connection via a pivot pin to complementary structure of the mounting means that comprises a horizontal pivot axis therethrough, the upper passageway optionally configured to accommodate a resilient bushing therein, and upper plate structure for engagement with a resilient element that resists pivoting movement of the field working or tillage tool about the horizontal pivot axis. The system may be provided as a kit comprising at least a mounting means, a pivot pin and a field working tool along with verbal or written instructions for assembling the field working tool to the mounting means. The instructions may comprise: aligning the passageway of the field wording tool with the complementary structure of the mounting means; inserting the pivot pin along the horizontal pivot axis; ensuring the resilient element is aligned with the upper plate structure; and, securing the pivot pin within the passageway. An inventive tillage implement comprising a plurality of the user configurable agricultural system is also provided.

Further features of the invention will be described or will become apparent in the course of the following description.

BRIEF DESCRIPTION OF THE DRAWINGS

In order that the invention may be more clearly understood, embodiments thereof will now be described in detail by way of example, with reference to the accompanying drawings, in which:

FIG. 1a is a top view of a tillage assembly according to the invention, shown in an extended orientation;

FIG. 1b is a right side view of the tillage assembly shown in FIG. 1a;

FIG. 1c is a front view of the tillage assembly shown in FIG. 1a;

FIG. 1d is a rear view of the tillage assembly shown in FIG. 1a;

FIG. 1e is a right side rear perspective view of the tillage assembly shown in FIG. 1 a;

FIG. 1f is a right side front perspective view of the tillage assembly shown in FIG. 1 a;

FIG. 3a is a top view of the tillage assembly according to the invention shown in FIG. 1a, but in a compressed orientation;

FIG. 3b is a right side view of the tillage assembly shown in FIG. 3a;

FIG. 3c is a front view of the tillage assembly shown in FIG. 3a;

FIG. 3d is a rear view of the tillage assembly shown in FIG. 3a;

FIG. 3e is a right side rear perspective view of the tillage assembly shown in FIG. 3 a;

FIG. 3f is a right side front perspective view of the tillage assembly shown in FIG. 3 a;

FIG. 4b is an enlarged left side view of a portion of the tillage assembly of FIG. 4a;

FIG. 6b is a top view of the tillage implement of FIG. 6a;

FIG. 7b is a right side view of the tillage assembly shown in FIG. 7a;

FIG. 7c is a front view of the tillage assembly shown in FIG. 7a;

FIG. 7d is a rear view of the tillage assembly shown in FIG. 7a;

FIG. 7e is a right side rear perspective view of the tillage assembly shown in FIG. 7a;

FIG. 7f is a right side front perspective view of the tillage assembly shown in FIG. 7a;

FIG. 9a is a top view of a tillage assembly according to another embodiment of the invention;

FIG. 9b is a right side view of the tillage assembly shown in FIG. 9a;

FIG. 9c is a front view of the tillage assembly shown in FIG. 9a;

FIG. 9d is a rear view of the tillage assembly shown in FIG. 9a;

FIG. 9e is a right side rear perspective view of the tillage assembly shown in FIG. 9a;

FIG. 9f is a right side front perspective view of the tillage assembly shown in FIG. 9a;

FIG. 10b is a right side view of the tillage assembly shown in FIG. 10a;

FIG. 10c is a front view of the tillage assembly shown in FIG. 10a;

FIG. 10d is a rear view of the tillage assembly shown in FIG. 10a;

FIG. 10e is a right side rear perspective view of the tillage assembly shown in FIG. 10a;

FIG. 10f is a right side front perspective view of the tillage assembly shown in FIG. 10a;

FIG. 11a is a top view of a planting unit comprising the mounting means according to the invention;

FIG. 11b is a right side view of the planting unit shown in FIG. 11a;

FIG. 11c is a front view of the planting unit shown in FIG. 11a;

FIG. 11d is a rear view of the planting unit shown in FIG. 11a;

FIG. 11e is a right side rear perspective view of the planting unit shown in FIG. 11a;

FIG. 11f is a right side front perspective view of the planting unit shown in FIG. 11a;

FIG. 12a is a top view of another embodiment of a tillage assembly according to the invention;

FIG. 12b is a right side view of the tillage assembly shown in FIG. 12a;

FIG. 12c is a front view of the tillage assembly shown in FIG. 12a;

FIG. 12d is a rear view of the tillage assembly shown in FIG. 12a;

FIG. 12e is a right side rear perspective view of the tillage assembly shown in FIG. 12a;

FIG. 12f is a right side front perspective view of the tillage assembly shown in FIG. 12a;

FIG. 13a is a left side view of another embodiment of a tillage assembly according to the invention, comprising a fluid pressure cylinder as a resilient element;

FIG. 13b is a rear view of the tillage assembly according to FIG. 13a;

FIG. 13c is a left side rear perspective view of the tillage assembly of FIG. 13a;

FIG. 14a is a left side view of another embodiment of a tillage assembly according to the invention, comprising a deformable pressurized pneumatic reservoir as a resilient element;

FIG. 14b is a rear view of the tillage assembly according to FIG. 14a;

FIG. 14c is a left side rear perspective view of the tillage assembly of FIG. 14a;

FIG. 15a is a left side view of another embodiment of a tillage assembly according to the invention, comprising a compression spring as a resilient element;

FIG. 15b is a rear view of the tillage assembly according to FIG. 15a; and,

FIG. 15c is a left side rear perspective view of the tillage assembly of FIG. 15a.

DESCRIPTION OF PREFERRED EMBODIMENTS

Figure 2:
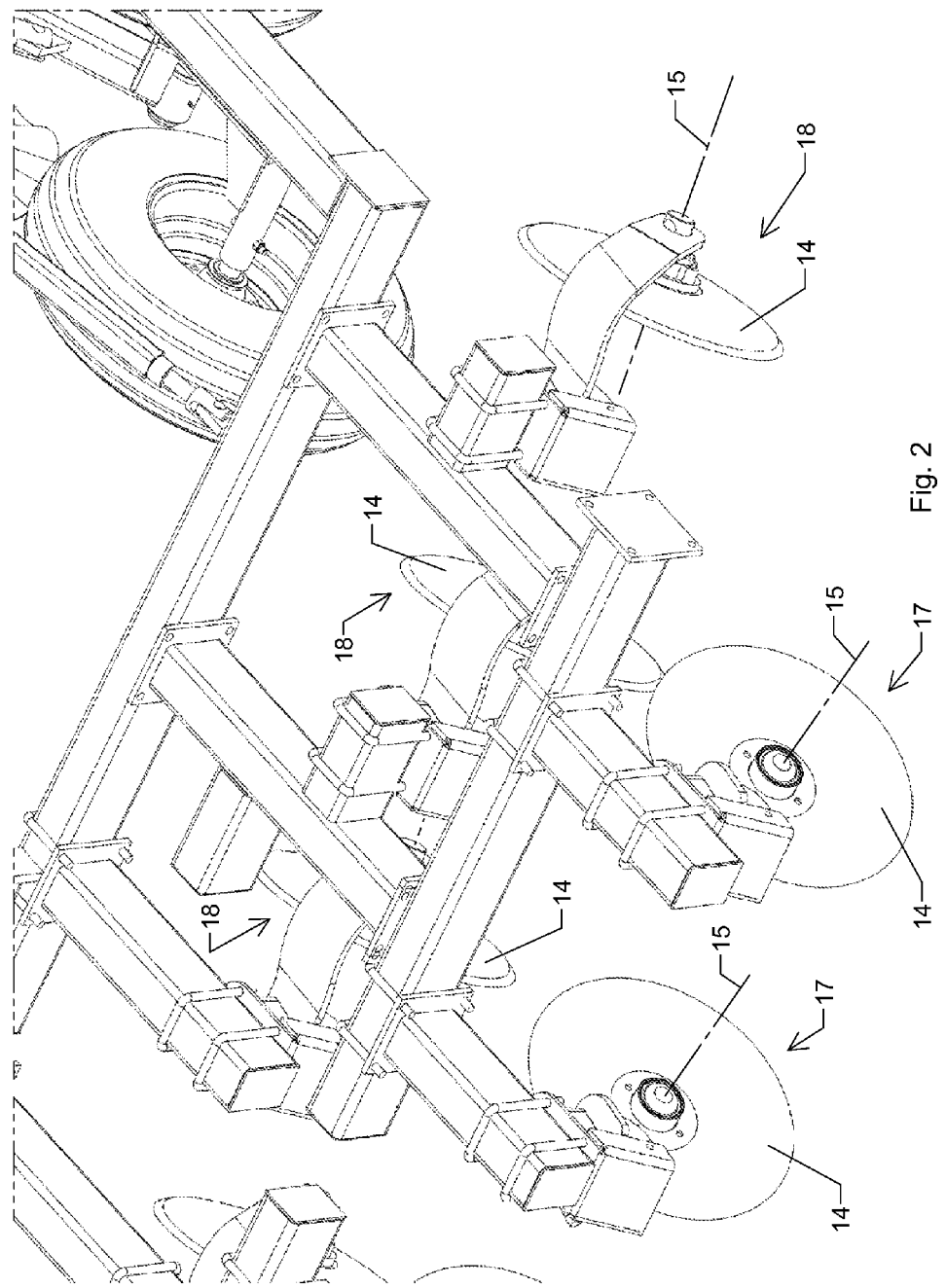
FIG. 2 is a left side front perspective view of the tillage assembly of FIG. 1a mounted to a frame portion of a tillage implement.

In describing the figures, like features are referred to by like reference numerals. Although not all features indicated on a particular drawing are necessarily described with reference to that drawing, all of the features are described with reference to at least one of the drawings.

Referring to FIGS. 1a-1f, an agricultural tool, in particular a tillage assembly, according to the invention comprises a mounting means 1 for securing the assembly to the underside of a frame member of an agricultural implement (not shown). The mounting means 1 includes a top plate 2 comprising a plurality of holes 3 for receiving an attachment means (not shown in this view, but normally comprising a pair of U-shaped hangers) for securing the mounting means 1 to the frame member. At the front end of the top plate 2 is provided a front plate 4 which may be attached to the top plate 2 or integrally formed therewith. The front plate 4 comprises a pair of side flanges 17 to provide it with additional strength. A pair of gussets 18a, 18b is also provided to reinforce the angular relationship between the front plate 4 and the top plate 2.

At the lower end of the front plate 4 is provided a pivot means 5, which will be described in greater detail hereinafter. The pivot means 5 comprises a pivot pin 6 through which passes a horizontal pivot axis 7. The pivot pin 6 may be continuous, or may be split into two pins 6a and 6b, as shown. A lower plate 8 comprises a pair of pivot lugs 9a, 9b that include apertures through which the pivot pin 6a, 6b passes, permitting the lower plate 8 to rotate about the pivot axis 7. A resilient element 10, comprising a deformable elastomeric block, is captivated between the upper and lower plates 1, 8. In this embodiment of the mounting means 1, the resilient element is secured to the upper plate 1, but not the lower plate 8, and has a substantially rectangular cross-section, although this need not necessarily be the case. Upon pivoting of the lower plate 8 about the pivot axis 7, the resilient element 10 is compressed, thereby resisting the pivoting movement.

A support arm 11 is attached to or integrally formed with the lower plate 8 of the mounting means 1. The support arm 11 comprises a resilient portion 12 made from spring steel. In certain embodiments, the entire support arm 11 may be made from spring steel. At the lower end of the support arm 11 is provided a rotatable hub 13, to which is mounted a concave disc blade 14. The support arm 11 is configured to provide a rotation axis 15 of the rotatable hub 13 with an angular orientation relative to both the forward direction and the horizontal.

These two angles are carefully selected in combination with one another in order to balance the forces transmitted through the tillage assembly such that they resolve in a substantially vertical direction. In other words, they are selected so as to impart little side loading to the resilient element 10. Side loading is detrimental in that it causes the resilient element 10 to distort, making it less able to absorb impact from obstacles and making the orientation of the blade 14 relative to the soil uncertain. Since it is important that the concave disc-shaped blade 14 is presented to the soil at an angle relative to the direction of travel of the implement, so that the soil can be turned over to bury surface crop residue, the side loading that would normally be imparted to the assembly by this configuration needs to be abated by careful selection of the angles. These angles are a function of the concavity of the disc blade 14, the diameter of the disc blade 14, the stiffness of the resilient portion 10 of the support arm 11 (measured by Rockwell C hardness), the desired working depth and working speed of the implement and the soil conditions.

The concavity of the disc blade 14 may be from 670-920 mm+/−50 mm. The diameter of the disc blade 14 may be from 16" to 24", preferably from 17" to 23", more preferably from 18" to 22", yet more preferably from 19" to 21". It will be appreciated by those skilled in the art that there are many types of concave disc blades 14 suitable for use with the invention. In particular, concave blades 14 having a wavy edge, a serrated edge or a notched edge may be used depending on the soil conditions and desired degree of tillage. The resilient portion 10 of the support arm 11 may have a Rockwell C hardness of from 30 to 55, preferably from 35 to 50, more preferably from 40 to 45. The desired working depth may be from 2" to 8", preferably 3" to 7", more preferably 4" to 6". The desired operational speed of the tillage implement may be in excess of 6 mph, preferably from 8 to 14 mph, more preferably 10 to 12 mph.

Referring to FIG. 2, the open or concave faces of the disc blades 14 of a first assembly 17 and a second assembly 18 are oriented towards one another. The complementary assemblies 17 and 18 are provided on opposite rows and laterally staggered from one another. This allows any soil that is thrown in one direction by the first assembly 17 to be thrown back in the opposite direction by the complementary second assembly 18, thereby leveling the soil better than compared with conventional non-opposing disc harrows. It can be seen that the rotation axis 15 of each assembly 17, 18 is angled with respect to the forward direction and horizontal. These two angles are of the same magnitude but opposite direction for the complementary assemblies.

Referring to FIGS. 3a-3f, upon impact with an obstacle during operation, the blade 14 is permitted to deflect upwardly and rearwardly by rotation of the support arm 11 and lower plate 8 about the horizontal pivot axis 7. This compresses the resilient element 10, which absorbs the energy of the impact without damage to the assembly. In addition, depending upon the angle at which the obstacle is struck, the support arm 11 is able to deflect laterally to absorb the impact. However, since the resilient portion 12 is made from a sufficiently stiff spring steel, it does not deflect during normal operation or in response to minor side loads. This reduces the tendency to place non-vertical loads on the resilient element 10, which prolongs its lifetime and allows the blade 14 to maintain its desired angular orientation with respect to the forward direction and horizontal.

Figure 4A:
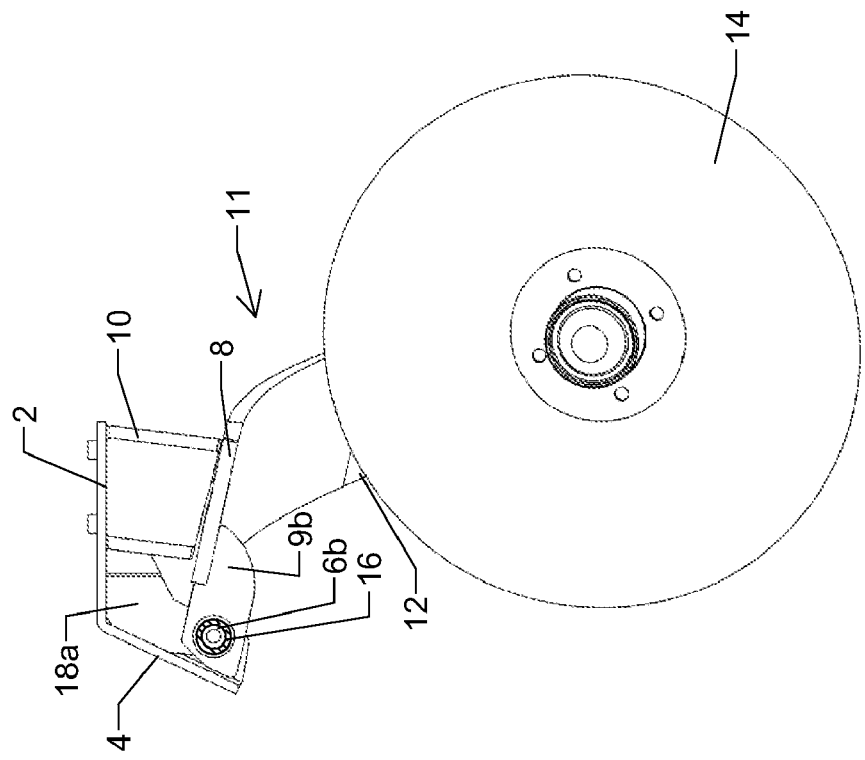
FIG. 4a is a left side view of the tillage assembly of FIG. 1a, with the side flange and gussets removed for clarity.
Figure 4B:
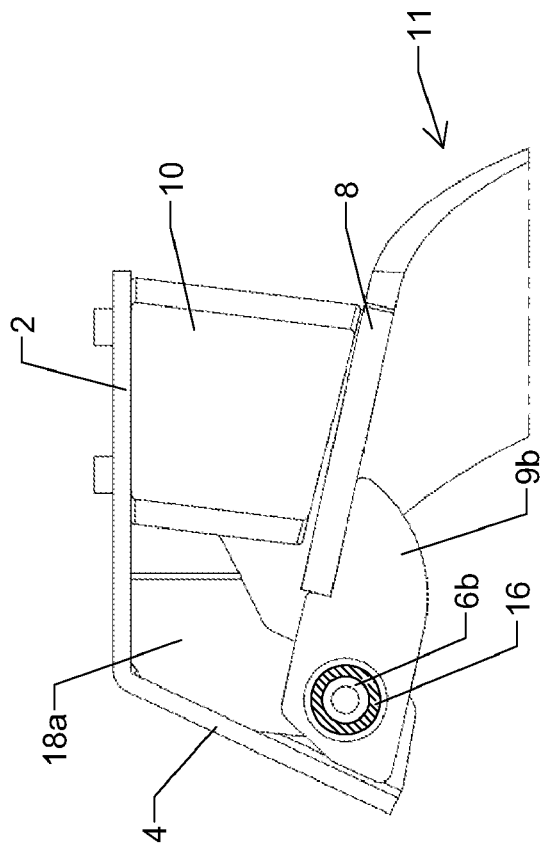
Figure 4C:
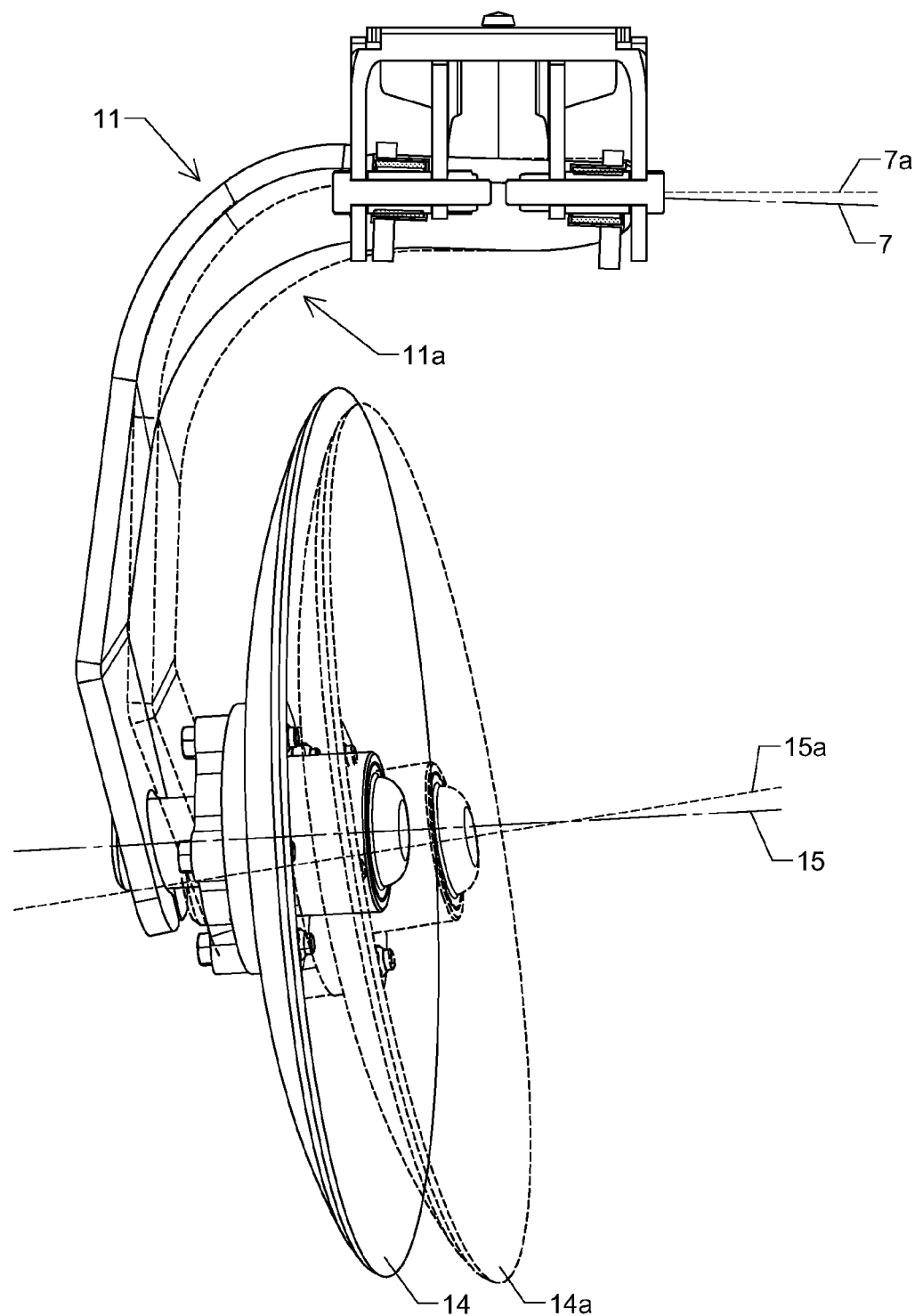
FIG. 4c is a rear view of the tillage assembly of FIG. 1a, illustrating sideways deflection of the support arm.

Referring to FIG. 4c, upon impact of the disc blade 14 with an obstacle, the disc blade momentarily deflects laterally due to resilient movement of the support arm 11. The support arm moves to position 11a and the disc blade to position 14a. The rotation axis 15 momentarily adopts an angular orientation 15a, as does the pivot axis 7, 7a.

Referring now to FIGS. 4a through 4c, upon lateral deflection of the support arm 11, the pivot pin 6 is urged into an angular orientation relative to the horizontal. This places momentary strain on the pivot pin 6. To mitigate this tendency, the pivot pin 6 is mounted within a resilient bushing 16 made from an elastomeric material. The elastomeric bushing is able to deform upon lateral deflection of the support arm 11, absorbing some of the load that would otherwise be transferred to the pivot pin 6. The bushing may be pre-compressed and/or may be provided with a clockwise or counter-clockwise bias to aid in resisting pivoting movement of the pivot pin 6. The resilient bushing 16 provides the added benefit of reducing wear caused by ingress of dirt to the pivot means.

By providing the support arm 11 with at least a resilient portion 12 and also by providing the resilient bushing 16, the assembly is able to absorb lateral deflection due to impact with obstacles and also rearward vertical deflection, thereby mitigating impact damage to the assembly regardless of the angle at which the obstacle is struck. This permits higher speeds to be used without excessive breakage.

Figure 5:
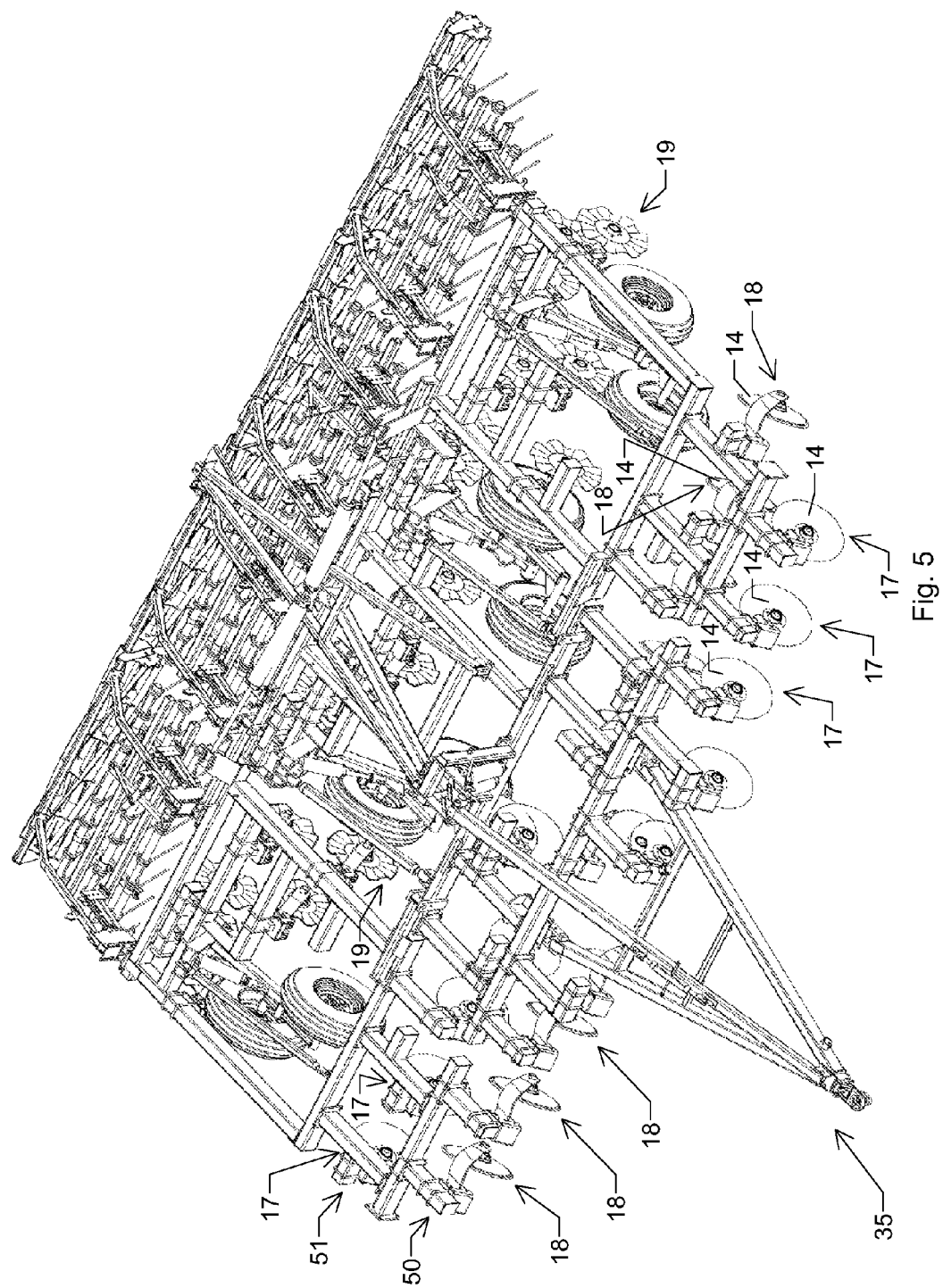
FIG. 5 is a front left side perspective view of a tillage implement according to the invention comprising a plurality of matched pairs of tillage assemblies according to the invention.
Figure 6A:
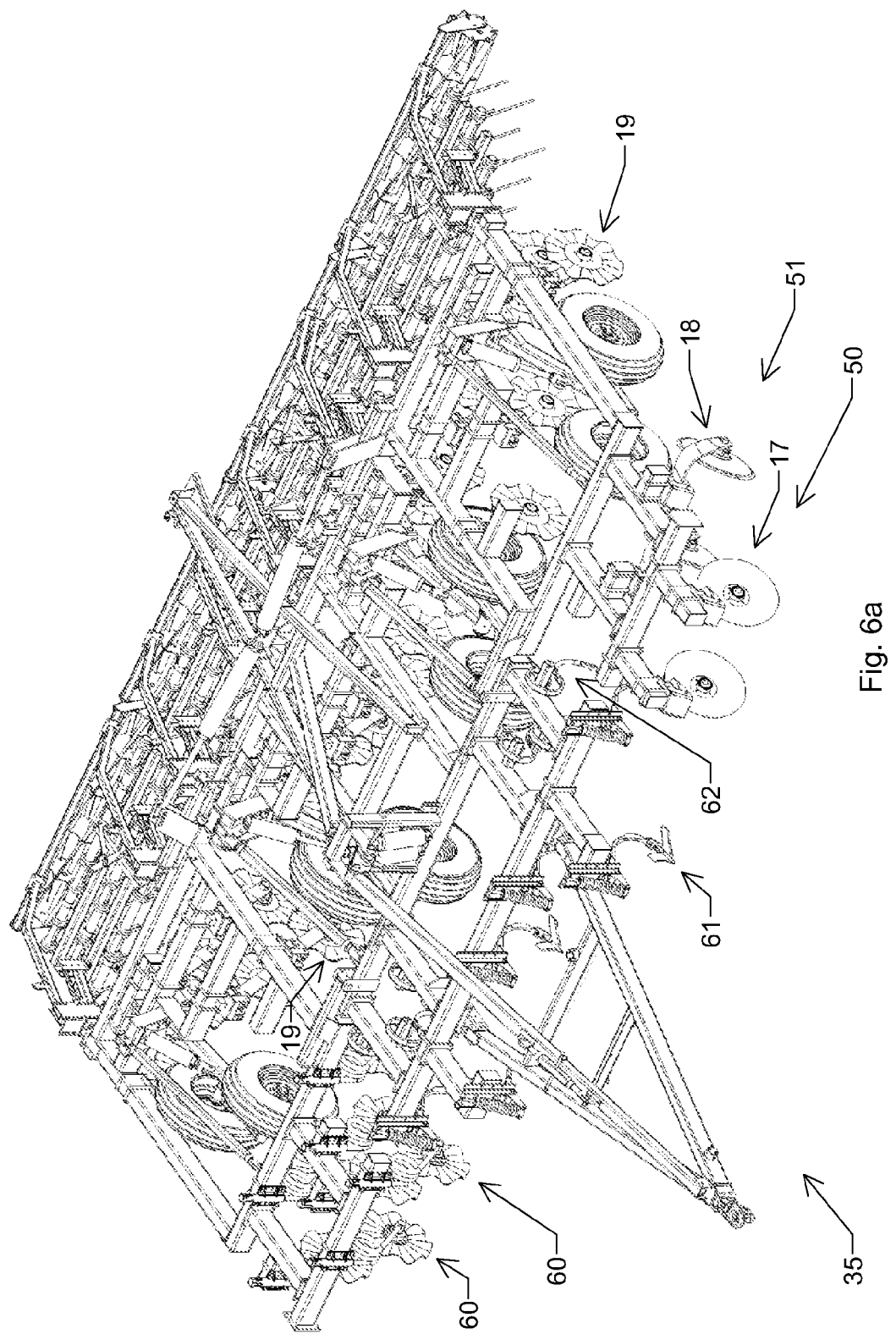
FIG. 6a is a front left side perspective view of another embodiment of a tillage implement according to the invention comprising a plurality of matched pairs of tillage assemblies according to the invention along with additional field working tools.
Figure 6B:
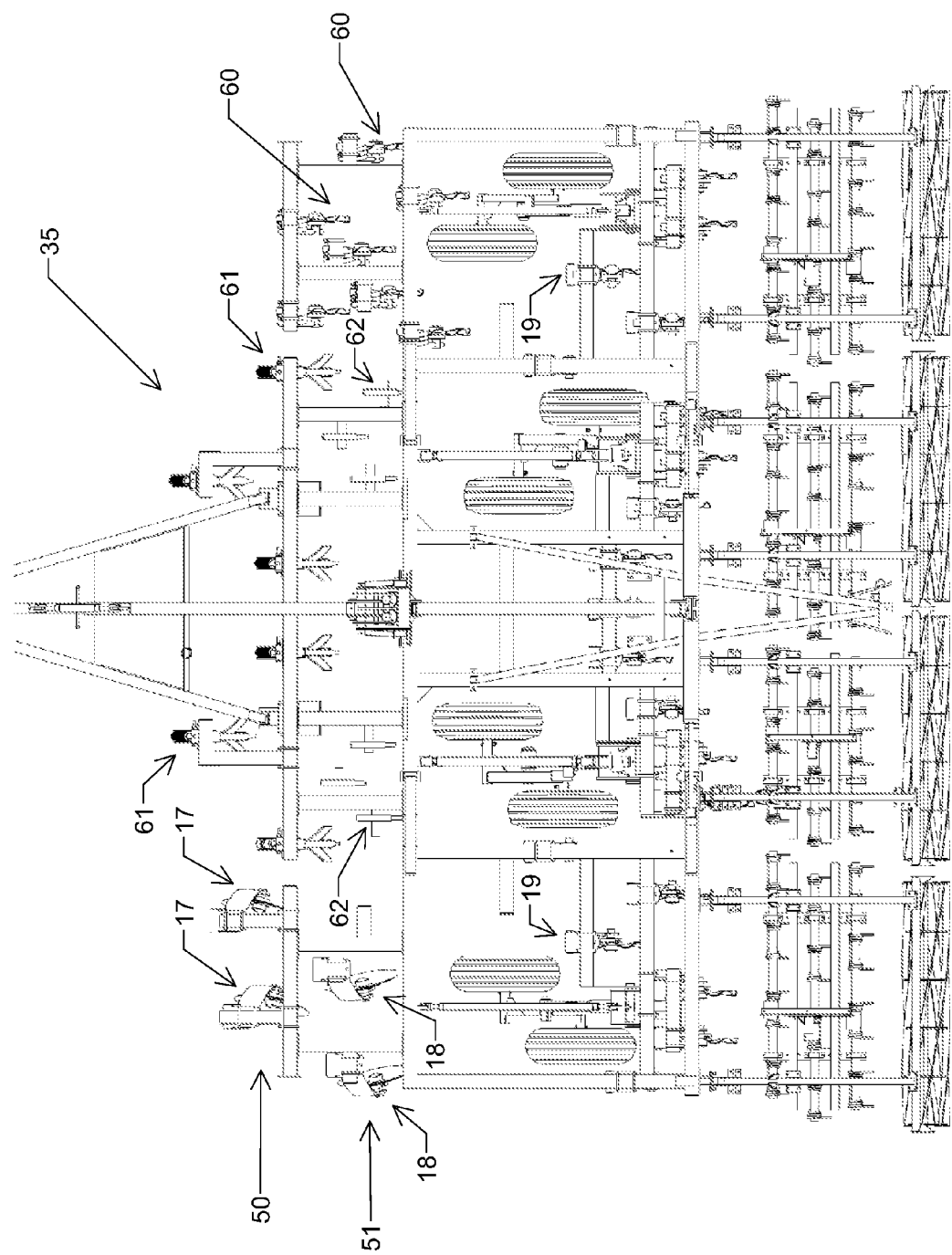
Figure 7A:
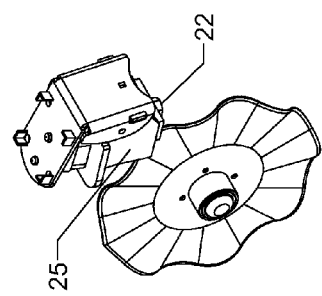
FIG. 7a is a right side sectional view of another embodiment of a tillage assembly according to the invention.
Figure 7F:
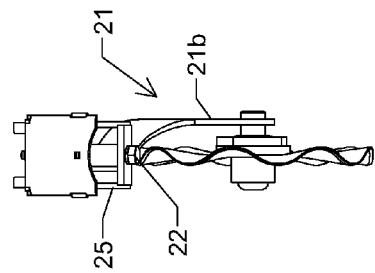
Figure 7B:
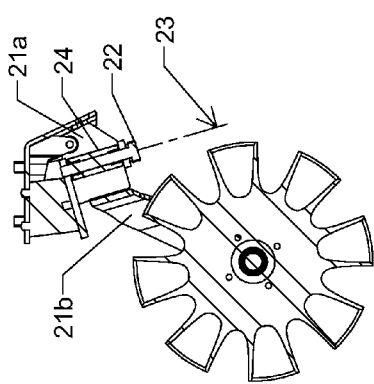
Figure 7C:
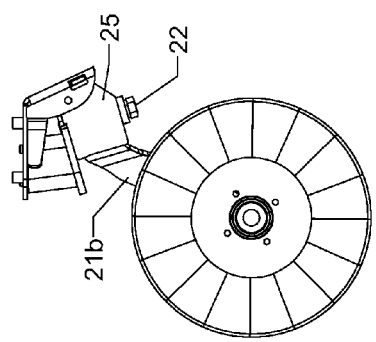
Figure 7E:
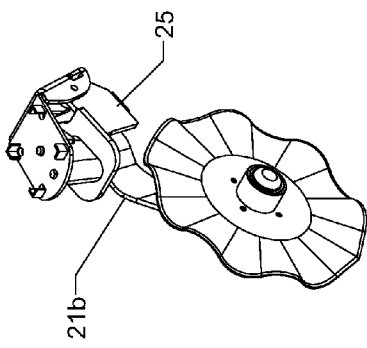
Figure 7D:
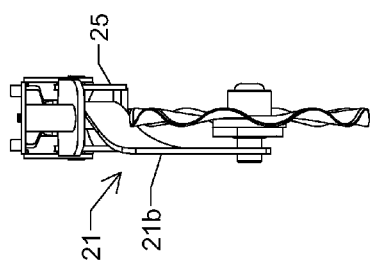

Referring to FIGS. 5 and 6a-6b, a tillage implement 35 is shown comprising complementary pairs of first and second tillage assemblies 17, 18 according to the invention. The assemblies 17, 18 are oriented with the concave sides of the blades 14 facing one another on adjacent rows. There are at least two rows 50, 51 of assemblies. The rows may comprise solely first assemblies (as shown in FIGS. 6a-6b) or first and second assemblies (as shown in FIG. 5). The first assemblies 17 on the first row 50 are laterally staggered relative to the second assemblies 18 in the adjacent row 51. There may be additional field working tools provided on the implement, such as inventive coulter wheel assemblies 19 or, referring specifically to FIGS. 6a-6b, prior art coulter wheel assemblies 60, C-shanks 61 and/or S-tines 62. All of the field working tools preferably include means to absorb impact with obstacles and thereby prevent damage to the tools or the implement 35 when operated at speeds in excess of 6 mph and preferably in the range of 8-14 mph.

Referring to FIGS. 7a-7f, a tillage assembly comprising a coulter wheel 20 with a wavy edge is shown. The support arm 21 comprises a vertical pivot 22. This allows a lower portion 21b of the support arm 21 to pivot relative to an upper portion 21a about a vertical axis 23. In the embodiment shown, the vertical pivot comprises a pin mounted within a complementary pivot housing 24 that may comprise bearings or a resilient bushing similar to the previously described resilient bushing 16. Since the upper portion of the support arm 21a is mounted to the mounting means via pivot pin 6, the entire support arm 21 including the vertical pivot 22 is able to deflect upwardly in response to impact with obstacles. Thus, operation of the assembly in terms of impact with obstacles is unaffected by the presence of the vertical pivot 22. When the implement 35 (shown in FIGS. 5 and 6a-6b) is turned around at the end of the field, it is normally necessary to raise the implement to prevent excessive side loading and undue stress on the tillage assemblies. Turning with the implement down also creates ruts in the field. However, with the vertical pivot 22 as shown, the implement 35 may be turned at the end of the field without raising it, whereby the lower portion 21b pivots about the vertical axis 23 without damage to the assembly or the implement. This allows for more complete tillage of the soil and prevents the formation of ruts that are difficult for subsequent pieces of farm equipment to traverse. The vertical pivot 22 optionally comprises means to restrict pivoting movement about the vertical axis 23 to a maximum angle relative to the forward direction, the maximum angle being from 10 to 30 degrees. The means to restrict pivoting movement may comprise side flanges 25, which are spaced apart by an amount selected so as to engage with the support arm 21 in the event that pivoting movement about the vertical axis 23 exceeds the pre-determined maximum angle. The support arm 21 depicted preferably does not comprise a resilient portion, as previously described with reference to other inventive tillage assemblies, so as to maintain a substantially vertical orientation for the vertical axis 23, without lateral deflection.

Since the coulter wheel 20 is not concave, it does not generally throw soil. There is therefore no need to provide an angle for its rotation axis relative to the forward direction and the horizontal, as previously described. This simplifies the geometry of the arm and allows the initial point of intersection between the soil and the circumference of the wheel 20 to be located directly beneath the resilient element 10 (i.e. along the vertical centerline of the assembly). The support arm 21 is therefore simply straight and attached to the lower plate 8 at the side thereof. Other geometries are possible, provided that the forces resolve through the vertical centerline passing through the resilient element 10.

Referring to FIGS. 9a-9f, another embodiment of a tillage assembly is shown that comprises a coulter wheel 20. The support arm 31 of this embodiment comprises a resilient portion 12, as previously described, to allow lateral deflection of the coulter wheel 20 in response to impact with obstacles.

Although not shown with reference to the embodiments of FIGS. 7a-7f or 9a-9f, either of these embodiments may include the resilient bushing 16 to protect the pivot pin 6 from dirt and/or damage due to lateral loads caused by impact with obstacles. It is particularly desirable that the resilient busing 16 be included with the embodiment of FIGS. 9a-9f, as lateral loads are expected in this configuration.

Figure 8:
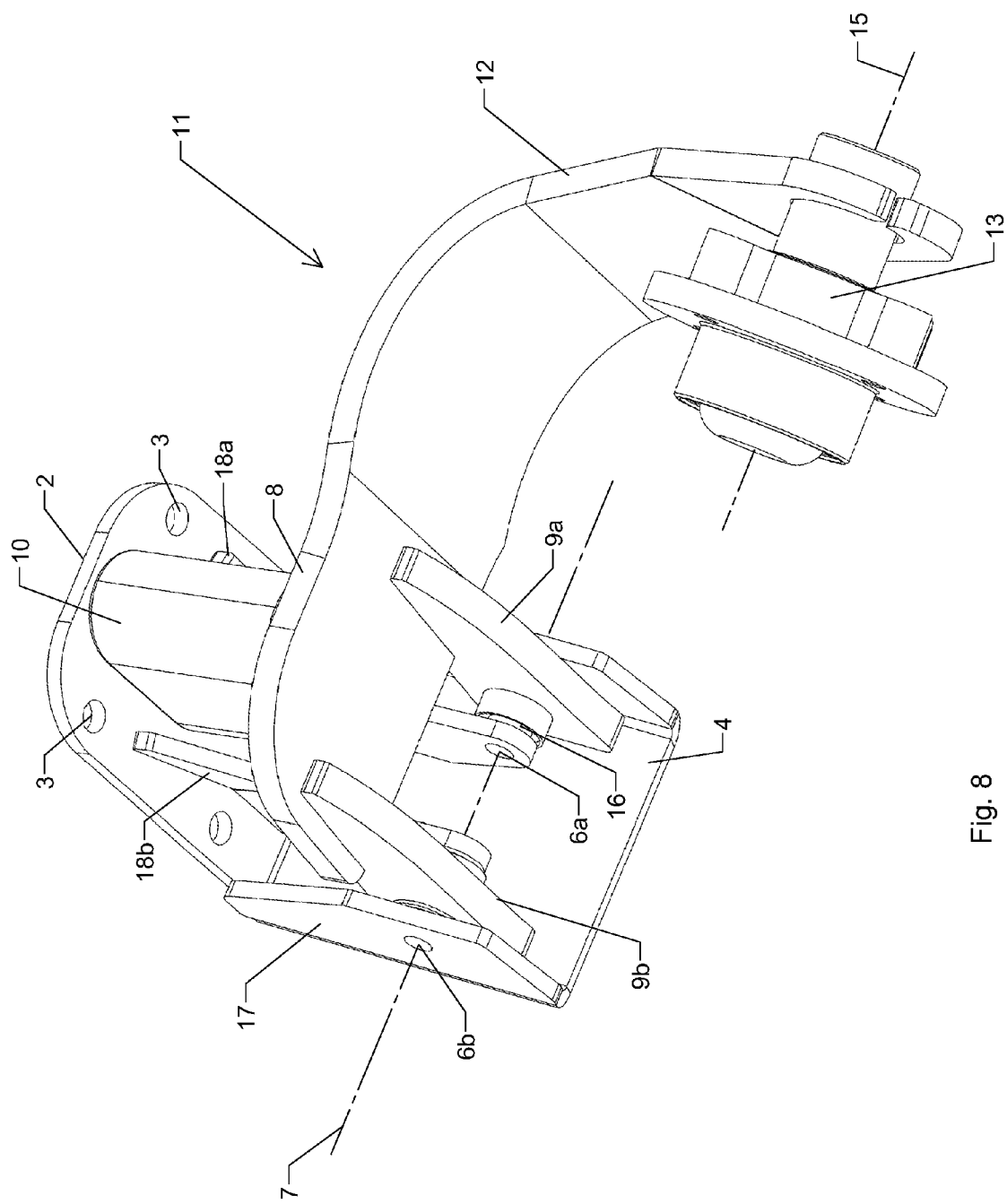
FIG. 8 is an enlarged perspective view of the underside of the tillage assembly of FIG. 1a, without the tillage blade.
Figure 10A:
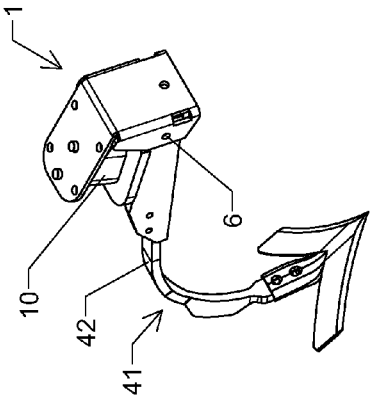
FIG. 10a is a top view of a tillage assembly according to the invention, comprising a C-shank support arm to which is mounted a shovel point cultivator tooth.
Figure 10C:
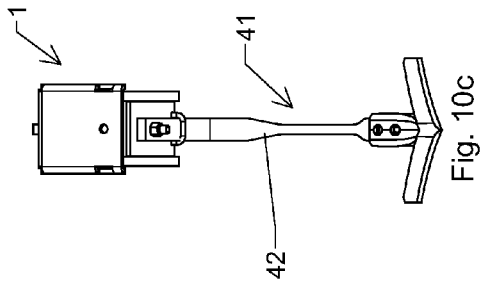
Figure 10B:
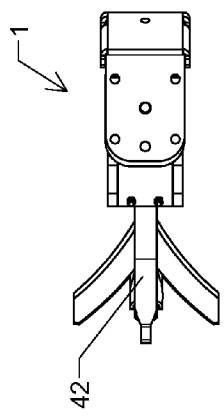
Figure 10F:
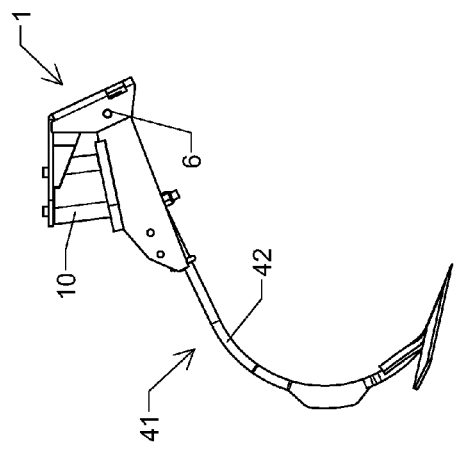
Figure 10E:
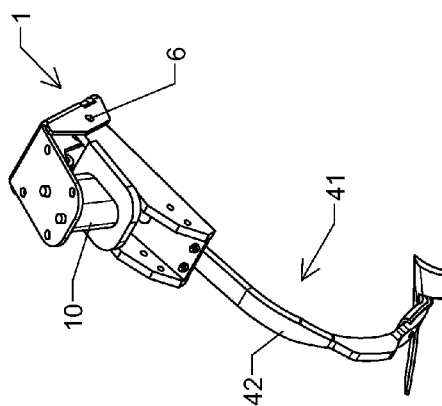
Figure 10D:
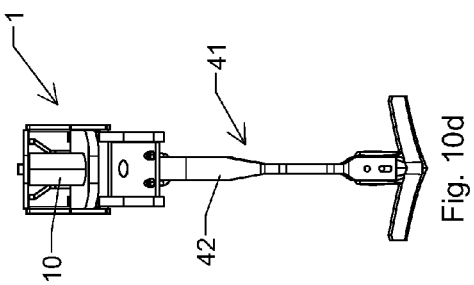

Referring to FIG. 8, a view from the underside of the mounting means 1, common to all of the aforementioned embodiments, reveals that the pivot pin 6 may be split into two pins, 6a and 6b, each of which is mounted within a resilient bushing 16. The lugs 9a and 9b allow the lower plate 8 to pivot about the horizontal pivot axis 7 and thereby compress the resilient element 10.

Referring to FIGS. 10a-10f, another embodiment of a tillage assembly comprising the inventive mounting means 1 is shown. The tillage assembly comprises a support arm 41 that is C-shaped and terminates in a shovel pointed tooth. This type of tillage tool is normally used in deeper tillage operations than the concave blade 14. The mounting means 1 comprises the resilient element 10, the pivot pin 6 and optionally the resilient bushing 16. A resilient portion 42 may be optionally provided on the support arm 41, although in this configuration the majority of the load due to impact with obstacles is transferred to the resilient element 10.

By comparing this embodiment to other embodiments described herein, it can be seen that the mounting means 1 is a common inventive element and that a variety of interchangeable field working tools can be provided on the mounting means. The mounting means and interchangeable field working tools comprise a user configurable agricultural system, as previously described. The system may be provided in the form of a kit or as part of a tillage implement, as previously described.

Referring to FIGS. 11a-11f, another embodiment of an agricultural tool comprising the inventive mounting means 1 is shown. The agricultural tool comprises a portion of a planting unit for use in the sowing of seeds. The planting unit is mounted to the frame of an appropriate implement and normally also includes a seed source, such as a hopper or tube pneumatically supplying seeds from a central reservoir, which deposits the seeds into a furrow created between the two coulter wheels 61a, 61b via conduit 62. A packing wheel 63 follows the coulter wheels 61a, 61b in order to close the furrow and cover the seeds. The relative down pressure provided by the packing wheel 63 can be adjusted via cam mechanism 64. The support arm 65 is interconnected with the inventive mounting means 1 in the manner as previously described with reference to other embodiments in order to impart load to the resilient element 10 in response to impact with obstacles.

Referring to FIGS. 12a-12f, another embodiment of a tillage assembly comprising the inventive mounting means 1 is shown. This embodiment is similar in most respects to the embodiment shown in FIGS. 9a-9f, however it includes a ripper tooth 70 mounted on a support arm extension 71 extending rearwardly from the lower part of the support arm 31. The support arm extension 71 and ripper tooth 70 both deflect upwardly in response to impact of the coulter wheel 20 with obstacles in the manner as previously described.

Referring to FIGS. 13a-13c, another embodiment of a tillage assembly comprising an inventive mounting means 101 is shown. In this embodiment, the resilient element 110 comprises a hydraulic or pneumatic cylinder that is compressible in response to upward and rearward deflection of the support arm 111 due to impact with obstacles. The degree of dampening of the upward and rearward deflection can be adjusted according to the pressure provided within the cylinder. The speed at which the cylinder reacts to upward and rearward deflection of the support arm 111, and with which it returns the support arm to its original condition, can be adjusted according to the permitted flow rate through the lines 180 connected to the cylinder.

Referring to FIGS. 14a-14c, another embodiment of a tillage assembly comprising an inventive mounting means 201 is shown. In this embodiment, the resilient element 210 comprises a pressurized pneumatic reservoir that is deformable in response to upward and rearward deflection of the support arm 211 due to impact with obstacles. The degree of dampening of the upward and rearward deflection can be adjusted according to the pressure provided within the reservoir via pneumatic line 280. The speed at which the cylinder reacts to upward and rearward deflection of the support arm 211, and with which it returns the support arm to its original condition, can be adjusted according to the elasticity of the reservoir.

Referring to FIGS. 15a-15c, another embodiment of a tillage assembly comprising an inventive mounting means 301 is shown. In this embodiment, the resilient element 310 comprises a compression spring that is compressible in response to upward and rearward deflection of the support arm 311 due to impact with obstacles. The degree of dampening of the upward and rearward deflection can be adjusted according to the stiffness of the spring.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A tillage assembly comprising:
a mounting comprising structure operatively linking
an upper mounting plate,
a lower mounting plate oriented beneath the upper mounting plate,
a resilient element between the upper mounting plate and the lower mounting plate, and
a pivot structure forward of the resilient element comprising a horizontal pivot axis about which relative pivoting movement occurs between the lower mounting plate and the upper mounting plate to thereby deform the resilient element;
a support arm extending downwardly and rearwardly from the mounting structure and interconnected with the lower mounting plate to pivot therewith about the horizontal pivot axis;
a rotatable hub attached to the support arm distal from the mounting structure, the rotatable hub having a rotation axis passing therethrough;
a concave rotatable tillage blade attached to the rotatable hub concentric with the rotation axis; and,
wherein the support arm comprises at least a resilient portion that deflects laterally in response to lateral movement of the tillage blade due to impact with obstacles.

2. The tillage assembly according to claim 1, wherein the support arm is configured and/or the rotatable hub is mounted to the support arm in order to provide an angle between the rotation axis and the forward direction and an angle between the rotation axis and horizontal.

3. The tillage assembly according to claim 1, wherein the resilient element is attached to the underside of the upper mounting plate.

4. The tillage assembly according to claim 1, wherein the resilient element is elastomeric.

5. The tillage assembly according to claim 1, wherein the resilient element has a rectangular cross-section.

6. The tillage assembly according to claim 1, wherein the support arm is configured such that the rotatable hub is laterally offset from a vertical centerline passing through the mounting structure.

7. The tillage assembly according to claim 1, wherein the support arm is integrally formed with the lower mounting plate.

8. The tillage assembly according to claim 1, wherein the support arm comprises a vertical pivot that is operable to permit a portion of the support arm to pivot relative to the mounting structure about a vertical axis in response to directional changes of the implement.

9. The tillage assembly according to claim 8, wherein the support arm comprises structure to restrict pivoting movement about the vertical axis to a maximum angle relative to the forward direction, the maximum angle being from 10 to 30 degrees.

10. The tillage assembly according to claim 1, wherein the pivot structure comprises a resilient bushing that permits a pivot pin aligned with the horizontal axis to momentarily adopt an angular orientation relative to horizontal in response to lateral movement of the tillage blade due to impact with obstacles.

11. The tillage assembly according to claim 2, wherein the angle between the rotation axis and the forward direction and the angle between the rotation axis and horizontal are selected so that the forces transmitted through the support arm to the pivot structure are substantially perpendicular to the horizontal axis in order to substantially minimize off-axis loads on the pivot structure.

12. A tillage assembly according to claim 1, wherein the tillage blade, when in operation, has a point of intersection on its circumference where it initially penetrates a soil surface that is substantially vertically aligned with a centerline of the mounting structure.

13. A tillage implement comprising:
an implement frame comprising frame members;
at least two longitudinally spaced apart rows of individually mounted tillage assemblies according to claim 1 secured to the frame members;
one row of tillage assemblies comprising a first assembly with a concave side of the rotatable tillage blade oriented towards a first side of the implement;
an adjacent row of tillage assemblies comprising a second assembly with a concave side of the rotatable tillage blade oriented towards a second side of the implement; and,
each first tillage assembly in the first row having a complementary second tillage assembly in the second row, the concave sides of the complementary first and second tillage assemblies facing one another, the complementary tillage assemblies laterally spaced apart from one another.

14. The tillage implement according to claim 13, wherein the first and second tillage assemblies are spaced apart from one another by an amount selected such that a majority of soil thrown by the first tillage assembly towards the first side is thrown back towards the second side by the second tillage assembly.

15. The tillage implement according to claim 13, wherein the support arm is configured and/or the rotatable hub is mounted to the support arm in order to provide an angle between the rotation axis and the forward direction and an angle between the rotation axis and horizontal.

16. The tillage implement according to claim 15, wherein the angle between the rotation axis and the forward direction and the angle between the rotation axis and horizontal are selected so that the forces transmitted through the support arm to the pivot structure are substantially perpendicular to the horizontal axis in order to substantially minimize off-axis loads on the pivot structure.

17. The tillage implement according to claim 13, wherein the resilient element is attached to the underside of the upper mounting plate.

18. The tillage implement according to claim 13, wherein the resilient element is elastomeric.

19. The tillage implement according to claim 13, wherein the resilient element is compressed upon upward pivoting about the horizontal pivot axis in response to the impact with obstacles.

20. A tillage assembly according to claim 1, wherein the resilient element is compressed upon upward pivoting about the horizontal pivot axis in response to the impact with obstacles.

21. The tillage implement according to claim 13, wherein the support arm is integrally formed with the lower mounting plate.

* * * * *